United States Patent [19]

Sato et al.

[11] Patent Number: 5,641,590
[45] Date of Patent: Jun. 24, 1997

[54] BATTERY HAVING SOLID ION CONDUCTIVE POLYMER ELECTROLYTE

[75] Inventors: Takaya Sato; Hiroshi Yoshida; Soichiro Takenishi, all of Tokyo; Yasunobu Kodama, Hyogo; Tsukasa Ito, Hyogo; Takashi Sakai, Hyogo, all of Japan

[73] Assignees: Nisshinbo Industries, Inc., Tokyo; Sanyo Electric Co., Ltd., Osaka, both of Japan

[21] Appl. No.: 561,913

[22] Filed: Nov. 22, 1995

[30] Foreign Application Priority Data

Aug. 3, 1995  [JP]  Japan .................................. 7-216511

[51] Int. Cl.$^6$ .......................................................... H01M 6/18
[52] U.S. Cl. .................................................. 429/192; 252/62.2
[58] Field of Search ............................... 429/192; 252/62.2

[56] References Cited

U.S. PATENT DOCUMENTS 5,453,335  9/1995  Fauteux et al. ........................ 429/192

*Primary Examiner*—Alan D. Diamond
*Attorney, Agent, or Firm*—Wenderoth, Lind & Ponack

[57] ABSTRACT

A battery having a solid ion conductive polymer electrolyte comprises a positive electrode, a negative electrode and a solid ion conductive polymer electrolyte layer formed by curing a composition for a solid polymer electrolyte comprising hydroxyalkyl polysaccharide and/or hydroxyalkyl polysaccharide derivative, an ester compound containing a polyoxyalkylene component, and an ion conductive metallic salt. The battery may be a rechargeable battery.

5 Claims, No Drawings

BATTERY HAVING SOLID ION CONDUCTIVE POLYMER ELECTROLYTE

BACKGROUND OF THE INVENTION

1. Field of the Invention

This invention relates to a battery having a solid ion conductive polymer electrolyte, more particularly to a rechargeable battery (secondary battery) having a solid ion conductive polymer electrolyte.

2. Description of the Background Art

As the electrolytes of rechargeable batteries, there have mainly been used liquid substances such as water, propylene carbonate, tetrahydrofuran and the like. Since a liquid electrolyte is apt to leak, however, a hermetically sealed container has to be used to ensure its long-term stability. Because of this, electrical and electronic devices using liquid electrolytes are heavy and require complex manufacturing processes.

In contrast, electrolytes consisting of ion-conductive solids involve almost no possibility of leakage, simplify manufacture and enable reduction of product weight. Owing to these advantages, they are being vigorously researched.

Solid ion conductive electrolytes can be divided into inorganic and organic material types. Organic solid ion conductive electrolytes are superior to inorganic solid ion conductive electrolytes in the points of weight, formability and flexibility.

Organic solid ion conductive electrolytes are generally formed of a matrix polymer and an ion conductive metallic salt which is a low molecular weight compound. The matrix polymer is the most important constituent of an organic solid ion conductive electrolyte because it is responsible both for solidifying the electrolyte and for serving as a solvent for dissolving the ion conductive metallic salt.

In 1978, M. B. Armand et al., working at the University of Grenoble in France, discovered that lithium perchlorate dissolves in polyethylene oxide and reported that this system exhibits ionic conductivity of $10^{-7}$ S/cm. Since then, similar research has been conducted regarding analogous polymers, including polypropylene oxide, polyethyleneimine, polyurethane, polyester and a wide range of other polymeric substances.

Application of organic polymers to solid electrolytes for rechargeable batteries is being pushed forward for taking advantage of their various merits, which include excellent film formability, flexibility and high energy characteristics when used in batteries.

As the polymer employed in the solid ion conductive electrolyte of a battery having a solid ion conductive polymer electrolyte, it is preferable to use one that ensures good interactivity in combination with the ion conductive metallic salt used in the solid ion conductive polymer electrolyte and, from this viewpoint, the preferred characteristics of the polymer are that it:

1) Exhibit interactivity with and be capable of dissolving the ion conductive metallic salt,
2) Have a donor type structure,
3) Have amorphous regions and exhibit a low glass transition temperature,
4) Not crystallize after dissolving the ion conductive metallic salt, and
5) Not react with electrochemically active substances.

Not many polymers meet all of these conditions. Polyethylene oxide, the most thoroughly researched polymer, satisfies conditions 1) and 2) to a high degree but, being a semicrystalline polymer, it forms a quasi-crosslinked structure that increases its crystallinity even further when a large amount of metallic salt is dissolved therein. It is therefore very unsatisfactory in terms of condition 4) and, as a result, exhibits conductivity that is considerably lower than might be expected.

To secure high ionic conductivity at room temperature, it is important to ensure the presence of many amorphous regions in which the ionic conductors can migrate and to use a polymer design which lowers the glass transition temperature of the polymer.

A method of introducing a branched structure into polyethylene oxide attempted for this purpose led to the synthesis of a polyethylene oxide derivative which exhibited high conductivity (about $10^{-4}$ S/cm at room temperature) as a solid ion conductive polymer electrolyte (Naoya Ogata et al., Sen'i Gakkaishi (Journal of the Society of Fiber Science and Technology, Japan) Vol 46, No 2, p52–57, 1990). Owing to the complexity of the polymer synthesis method, however, the method has not been commercialized.

Another reported method for securing high ionic conductivity is that of imparting a three-dimensional network structure to a matrix polymer so as to prevent its crystallization. In one such method, for example, a solid ion conductive polymer electrolyte is obtained by crosslinking a polyoxyalkylene derivative of glycerin with polyisocyanate compound.

Owing to the following unsolved problems, however, this method has not led to the development of a practical battery having solid polymer electrolyte:

Isocyanate reacts easily with moisture and is therefore difficult to manage from the points of storage and reactivity.

The urethane crosslinking reaction between the polyoxyalkylene derivative of glycerin and the polyisocyanate compound is affected by the ion conductive metallic salt and solvent components. As a result, the reactivity may be reduced or the reaction be accelerated. Because of this, the method of synthesizing the polymer matrix first and then impregnating it with the ion conductive metallic salt together with an appropriate solvent is generally used, despite its poor industrial productivity.

Widely used general-purpose aromatic isocyanate is susceptible to electrochemical degradation, while the reactivity of aliphatic isocyanate is low.

Formation into film requires a long period of reaction under heating.

SUMMARY OF THE INVENTION

An object of the present invention is therefore to overcome the aforesaid shortcomings of the prior art by providing a battery which uses a solid ion conductive polymer electrolyte with high ion conductivity, excellent film formability, high film toughness and strength and excellent handling properties during industrial manufacture and which as a result has no possibility of liquid leakage to the exterior, has extremely high workability, and exhibits high safety and long-term reliability.

Another object of the invention is to provide a battery which uses a solid ion conductive polymer electrolyte which further exhibits high performance and high energy density.

For attaining these objects, the present invention provides a battery having the solid ion conductive polymer electrolyte described in the following disposed between its negative electrode and positive electrode.

A solid ion conductive polymer electrolyte having a semi-interpenetrating polymer network structure (semi-IPN structure) was synthesized by using an ester compound containing a polyoxyalkylene component to form a hydroxyalkyl polysaccharide and/or a hydroxyalkyl polysaccharide derivative containing an ion conductive metallic salt into a three-dimensional network structure.

In the course of their research for finding polymer and ion conductive metallic salt combinations with good interactivity, the inventors further discovered that hydroxyalkyl polysaccharides and hydroxyalkyl polysaccharide derivatives are good solvents of ion conductive metallic salts, satisfy all the earlier mentioned conditions 1)–5) required of a polymer for use in a solid ion conductive polymer electrolyte, and exhibit high conductivity.

Unlike the case of merely mixing different types of polymer, the formation of the semi-IPN structure provides a number of advantages, including enhanced compatibility between the different types of polymer chains and increased interchain bonding force. The film characteristics of the hydroxyalkyl polysaccharide or the hydroxyalkyl polysaccharide derivative of this invention is markedly improved by the formation of a semi-IPN structure.

DESCRIPTION OF THE PREFERRED EMBODIMENTS

The term "hydroxyalkyl polysaccharide" used herein encompasses three types: hydroxyethyl polysaccharide, hydroxypropyl polysaccharide and dihydroxypropyl polysaccharide, which are respectively obtained by reacting naturally occurring polysaccharide such as cellulose, starch or the like with ethylene oxide, propylene oxide, and glycidol or 3-chloro-1,2-propanediol, respectively.

The invention can also use polysaccharides having two or more types of hydroxyalkyl groups, such as hydroxpropyl and dihydroxypropyl polysaccharides obtained by reacting a polysaccharide with both propylene oxide and gylcidol.

The term "hydroxyalkyl polysaccharide derivative" used herein refers to a polysaccharide obtained by introducing substituents through ester or ether bonding to some or all of the hydroxy groups in a hydroxyalkyl polysaccharide.

In this invention, hydroxyalkyl polysaccharide and hydroxyalkyl polysaccharide derivative can be used either separately or in combination.

Usable polysaccharides include cellulose, starch, amylose, amylopectin, pullulan, Curdlan, mannan, glucomannan, arabinan, chitin, chitosan, alginic acid, carrageenan, dextran and the like. The polysaccharides are not limited as regards molecular weight, presence/absence of branched structure, type, orientation or sequence of their constituent saccharides, or the like.

From the point of view of easy procurement, however, cellulose and starch are preferable. Four types, hydroxyethyl cellulose, hydroxyethyl starch, hydroxypropyl cellulose and hydroxypropyl starch, are commercially available as products with various molar substitutions (MS) (molar substitution is a value indicating the number of substituent moles introduced per unit saccharide of the polysaccharide).

A method for synthesis of dihydroxpropyl cellulose is set out in U.S. Pat. No. 4,096,326 (1978). Other dihydroxpropyl polysaccharides can be synthesized by referring to known methods. (See T. Sato, et al., Makromol. Cem., 193,647 (1992) or Macromolecules 24, 4691 (1991)).

These hydroxyalkyl polysaccharides can be used for solid ion conductive polymer electrolytes.

Hydroxyalkyl polysaccharides usable in the invention have molar substitutions of not less than 2. A hydroxyalkyl polysaccharide whose molar substitution is smaller than 2 is not usable because of its insufficient ability to dissolve ion conductive metallic salts.

The hydroxyalkyl polysaccharide should have a molar substitution of not higher than an upper limit of 30, preferably not higher than 20. This is because industrial production of hydroxyalkyl polysaccharides with molar substitutions greater than 30 is difficult in light of the cost of industrial scale production and the complexity of the synthesis operation. Even if the effort to obtain molar substitutions of greater than 30 should be made, the increase in conductivity obtained would probably not be commensurate with the increase in molar substitution.

The invention can also use a hydroxyalkyl polysaccharide derivative obtained by introducing substituents through ester bonding or ether bonding to some or all of the hydroxy groups in a hydroxyalkyl polysaccharide Specifically, it is possible to use a hydroxyalkyl polysaccharide derivative obtained by introducing substituents including $C_1$–$C_5$ alkyl, preferably $C_1$–$C_3$ alkyl, aromatic substituent groups and cyano groups into a hydroxyalkyl polysaccharide by use of ester bonding or ether bonding.

The derivative obtained when hydroxy groups of hydroxypropyl cellulose are replaced by methyl groups, for example, is methylhydroxy.propyl cellulose, and is commercially available.

Moreover, cyanoethylated hydroxypropyl cellulose obtained by cyanoethylating hydroxypropyl cellulose, for example, also exhibits good properties for a solid ion conductive polymer electrolyte. (See Examples.)

An ion conductive metallic salt is dissolved in a hydroxyalkyl polysaccharide and/or hydroxyalkyl polysaccharide derivative set out in the foregoing to obtain a solid ion conductive polymer electrolyte.

The metallic salt used in the invention is not particularly limited and may be any such salt ordinarily used in electrochemical devices, including, for example, one or a mixture of two or more of $LiClO_4$, $LiBF_4$, $LiAsF_6$, $LiPF_6$, $LiSbF_6$, $LiCF_3SO_3$, $LiCF_3COO$, $NaClO_4$, $NaBF_4$, $NaSCN$, $KBF_4$, $Mg(ClO_4)_2$, $Mg(BF_4)_2$, $(C_4H_9)_4NBF_4$, $(C_2H_5)_4NBF_4$ and $(C_4H_9)_4NClO_4$.

When the metallic salt is added at less than 0.1 wt % based on the total weight of the complex (the solid ion conductive polymer electrolyte), the ionic conductor concentration is too lean, with the result that the conductivity is impractically low. A content in excess of 30 wt % exceeds the power of most polymer matrices to dissolve ion conductive metallic salt and results in salt precipitation. The amount of added metallic salt is therefore preferably 0.1–30 wt %.

Solid ion conductive polymer electrolytes are generally used in the form of a film clamped between electrodes. Because of this, they are required to have excellent film formability and produce strong films.

The complex obtained according to the invention by dissolving an ion conductive metallic salt in a hydroxyalkyl polysaccharide and/or a hydroxyalkyl polysaccharide derivative is, as formed, insufficient in film formability and film strength for use as a solid ion conductive polymer electrolyte.

For example, at room temperature some types of hydroxyalkyl polysaccharide derivatives with high molar substitutions exhibit liquid crystallinity, have high fluidity and cannot be termed a "solid." In addition, most hydroxyalkyl polysaccharides and hydroxyalkyl polysaccharide derivatives with high molar substitutions are syrupy or waxy in appearance.

Through their research directed to overcoming these problems, the inventors discovered that excellent film formability and film strength can be imparted by mixing an ester compound containing a polyoxyalkylene component with a complex of a hydroxyalkyl polysaccharide and/or hydroxyalkyl polysaccharide derivative and an ion conductive metallic salt, reacting the complex by exposing it to ultraviolet rays, an electron beam, X rays, gamma rays, microwaves or high-frequency waves, or by heating it, thereby forming a three-dimensional crosslinked network.

The ester compound containing a polyoxyalkylene component may, for example, be a diester compound containing a polyoxyalkylene component having the molecular structure defined by the formula

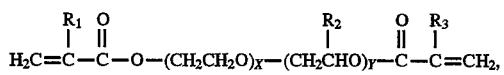

(wherein $R_1$, $R_2$, $R_3$ each represents H, $C_1$–$C_5$ alkyl, preferably $C_1$–$C_3$ alkyl and may be the same or different, and X and Y satisfy the condition of $X+Y \leq 50$, $X \geq 1$ and $Y \geq 0$ or the condition of $X+Y \leq 50$, $X \geq 0$ and $Y \geq 1$), or a monoester compound containing a polyoxyalkylene component having the molecular structure defined by the formula

(wherein $R_4$, $R_5$, $R_6$ each represents H or $C_1$–$C_5$ alkyl, preferably $C_1$–$C_3$ alkyl and may be the same or different, and A and B satisfy the condition of $A+B \leq 50$, $A \geq 1$ and $B \geq 0$ or the condition of $A+B \leq 50$, $A \geq 0$ and $B \geq 1$). However, it is not limited to these.

When the diester compound containing a polyoxyalkylene component and/or the monoester compound containing a polyoxyalkylene component are mixed with the hydroxyalkyl polysaccharide and/or hydroxyalkyl polysaccharide derivative and the ion conductive metallic salt and, as contained in this mixture, are heated or exposed to ultraviolet rays, an electron beam, X rays, γ rays, microwaves or high-frequency waves, they react to form a three-dimensional crosslinked network structure of semi-IPN structure.

Unlike the case of merely mixing different types of polymer, the formation of the semi-IPN structure provides a number of advantages, including enhanced compatibility between the different types of polymer chains and increased interchain bonding force.

The film formability of the hydroxyalkyl polysaccharide and/or the hydroxyalkyl polysaccharide derivative of this invention is markedly improved by the formation of a semi-IPN structure.

The ester compound containing a polyoxyalkylene component is preferably added in the amount of 20–2000 wt % based on the weight of the hydroxyalkyl polysaccharide and the hydroxyalkyl polysaccharide derivative.

When the content of the ester compound containing a polyoxyalkylene component is less than 20 wt %, the film strength does not increase. A content of the ester compound containing a polyoxyalkylene component in excess of 2,000 wt % results in a highly friable film and causes other problems. It also impairs the charge-discharge cycle property of the battery using the solid ion conductive polymer electrolyte.

While the ratio between the amounts of the diester compound containing a polyoxyalkylene component and the monoester compound containing a polyoxyalkylene component is not particularly limited, from the point of film strength it is preferable for their weight ratio to be in the range of (diester compound containing a polyoxyalkylene component)/(monoester compound containing a polyoxyalkylene component)=2.0–0.2.

Although addition of a polymerization initiator is not required when the polymerization is conducted by use of an electron beam, one is ordinarily used in other cases. While the polymerization initiator is not particularly limited, it is possible to use such photopolymerization initiators as acetophenone, trichloroacetophenone, 2-hydroxy-2-methylpropiophenone, 2-hydroxy-2-methylisopropiophenone, 1-hydroxycyclohexylketone, benzoinether, 2,2-diethoxyacetophenone and benzyldimethylketal.

Moreover, as thermalpolymerization initiators there can be used such high-temperature initiators such as cumenehydroperoxide, t-butylhydroperoxide, dicumyl peroxide and di-t-butyl peroxide, such ordinary initiators as benzoyl peroxide, lauroyl peroxide, persulfate and azobisisobutyronitrile, such low-temperature initiators (redox initiators) as hydrogen peroxide.ferrous salt, persulfate.acid sodium bisulfite, cumenehydroperoxide.ferrous salt, benzoyl peroxide.dimethylaniline, and peroxide.organometallic alkyl, triethylboron, diethylzinc, oxygen.organometallic alkyl and the like.

These polymerization initiators can be used singly or in mixtures of two or more. The polymerization initiator is added in the range of 0.01 wt % to 1 wt % based on the total weight of the ester compound containing a polyoxyalkylene component. Addition of less than 0.01 wt % is not preferable because the rate of polymerization becomes extremely low, while addition of more than 1 wt % is a waste of initiator.

The polymerization reaction conditions are not particularly limited. Photopolymerization, for example, is conducted under conditions of room temperature and exposure to ultraviolet rays in air at a luminous energy of 1–50 mW/cm² for 5–30 min. When an electron beam is used, an acceleration voltage of 150–300 kV at room temperature suffices. In the case of thermalpolymerization, the reaction is conducted for 0.5–6 hours at 50°–120° C.

The polymer produced by photopolymerization forms a strong three-dimensional network structure by intertwining with molecular chains of the hydroxyalkyl polysaccharide or hydroxyalkyl polysaccharide derivative. No crystalline structure is formed and the matrix is amorphous.

From the points of equipment simplicity and running cost, the polymerization is preferably conducted by ultraviolet radiation or heating.

The polymerization reaction of the ester compound containing a polyoxyalkylene component under exposure to ultraviolet rays or heating progresses without interference from the ion conductive metallic salt mixed with the system. Therefore, unlike in the case of using a conventional polyurethane crosslinking agent, no need arises whatsoever for adopting the two-stage method (the impregnation method) in which the three-dimensional structure is formed using a system free of ion conductive metallic salt, whereafter the ion conductive metallic salt is dissolved in a solvent and the matrix polymer is impregnated with the ion conductive metallic salt together with the solvent.

The invention solid ion conductive polymer electrolyte is ordinarily produced in the following manner.

A prescribed amount of a hydroxyalkyl polysaccharide and/or a hydroxyalkyl polysaccharide derivative, a prescribed amount of an ion conductive metallic salt and a prescribed amount of an ester compound containing a polyoxyalkylene component are mixed in an appropriate amount of solvent.

The mixed solution is adjusted to the desired concentration by heating under reduced pressure to evaporate the solvent. It suffices to evaporate the solvent until the solution reaches a viscosity easily castable on the electrode.

If it is desired to increase the amount of ion conductive metallic salt dissolved in the solid ion conductive polymer electrolyte according to the invention and to increase the migration of dissolved metallic ions into the polymer matrix, the solvent need not be completely evaporated and a desired amount thereof can be left unevaporated.

In the solid ion conductive polymer electrolyte, since the polysaccharide polymer chains and the polymer chains of the copolymerized ester compound containing a polyoxyalkylene component intertwine to form a network structure, no problem whatsoever arises as regards film strength even if the solvent is allowed to remain at the rate of 1 wt % to 500 wt % based on the total weight of the system components other than the solvent (the total weight of the hydroxyalkyl polysaccharide and/or hydroxyalkyl polysaccharide derivative, the ion conductive metallic salt, the ester compound containing a polyoxyalkylene component and the polymerization initiator).

Residual solvent of more than 500 wt % is undesirable since a content of this level reduces the film strength no matter how strong a network structure is formed. On the other hand, residual solvent of less than 1 wt % produces no effect.

Solvents usable in the solid ion conductive polymer electrolyte according to this invention include chain ethers such as dibutylether, 1,2-dimethoxyethane, 1,2-ethoxymethoxyethane, methyldiglyme, methyltriglyme, methyltetragylme, ethylgylme, ethyldigylme, butyldiglyme and the like, and glycolethers (ethyl Cellosolve, ethyl Carbitol, butyl Cellosolve, butyl Carbitol and the like), heterocyclic ethers such as tetrahydrofuran, 2-methyltetrahydrofuran, 1,3-dioxolan and 4,4-dimethyl-1,3-dioxane, such butyrolactones as γ-butyrolactone, γ-valerolactone, δ-valerolactone, 3-methyl-1,3-oxazolidine-2-on, 3-ethyl-1,3-oxazolidine-2-on, and other solvents commonly used in electrochemical devices such as water, alcohol solvents (methanol, ethanol, butanol, ethylene glycol, propylene glycol, diethylene gylcol, 1,4-butanediol, glycerin and the like), polyoxyalkylenepolyols (ethylene oxide, polypropylene oxide, polyoxyethylene.oxypropylene glycol and combinations of two or more of these), amide solvents (N-methylformamide, N,N-dimethylformamide, N-methylacetoamide, N-methylpyrrolidinone and the like), carbonate solvents (propylene carbonate, ethylene carbonate, styrene carbonate and the like). Mixtures of two or more of these solvents can be used.

The aforesaid solid ion conductive polymer electrolyte is preferably formed into a film by application to a uniform thickness by roll coating, screen coating, the doctor blade method or other such method using an applicator roll or by spin coating, bar coating or other such means. The film forming method is, however, not limited to these.

Positive electrode active materials usable for the positive electrode in this invention include, but are not limited to, the following battery electrode materials: $CuO$, $Cu_2O$, $Ag_2O$, $CuS$, $CuSO_2$ and other Group I metal compounds, $TiS$, $SiO_2$, $SnO$ and other Group IV metal compounds, $V_2O_5$, $V_6O_{13}$, $VO_x$, $Nb_2O_5$, $Bi_2O_3$, $Sb_2O_3$ and other Group V metal compounds, $CrO_3$, $Cr_2O_3$, $MoO_3$, $MoS_2$, $WO_3$, $SeO_2$ and other Group VI metal compounds, $MnO_2$, $Mn_2O_4$ and other Group VII metals, $Fe_2O_3$, $FeO$, $Fe_3O_4$, $Ni_2O_3$, $NiO$, $CoO_2$ and other Group VIII metal compounds, and material systems including polypyrrole, polyaniline, poly-p-phenylene, polyacetylene, polyacen and other conductive polymer compounds.

Any of these positive electrode active materials can be added with solid ion conductive polymer electrolyte, binding agent, conductive agent and the like and used as a composite positive electrode. Solid ion conductive polymer electrolytes usable for this purpose. include those described in the foregoing as well as polyethylene oxide, polyethyleneimine, polyacrylonitrile and the like.

Usable binding agents include polyvinylidene fluoride, ethylene.propylene.diene copolymer and the like. As conductive agent there can be used acetylene black, natural graphite and the like.

The aforesaid composite positive electrode material is preferably formed into a film by application to a uniform thickness by roll coating, screen coating, the doctor blade method or other such method using an applicator roll or by spin coating, bar coating or other such means. The film forming method is, however, not limited to these.

As negative electrode active materials there can be used alkaline metals, alkaline alloys, carbon materials, and the materials listed above as positive electrode active material.

Specific examples of alkaline metals and alkaline metal alloys that can be used include metallic Li, Li—Al, Li—Mg, Li—Al—Ni, Na, Na—Hg, Na—Zn and the like.

Usable carbon materials include graphite, carbon black, coke, glassy carbon, carbon fiber, burned products of any of the foregoing, and the like.

While some of these negative electrode active materials can be used alone, they can also be added with solid ion conductive polymer electrolyte, binding agent, conductive agent and the like and used as a composite negative electrode. Solid ion conductive polymer electrolytes usable for this purpose include those described in the foregoing as well as polyethylene oxide, polyethyleneimine, polyacrylonitrile and the like.

Usable binding agents include polyvinylidene fluoride, ethylene.propylene.diene copolymer and the like. As conductive agent there can be used acetylene black, natural graphite and the like.

The aforesaid composite negative electrode material is preferably formed into a film by application to a uniform thickness by roll coating, screen coating, the doctor blade method or other such method using an applicator roll or by spin coating, bar coating or other such means. The film forming method is, however, not limited to these.

EXAMPLES

The invention will now be explained in detail with reference to specific examples. It is not, however, limited to the described examples.

Example 1

One gram hydroxypropyl cellulose (molar substitution (MS)=4.65, product of Nippon Soda Co. Ltd.) and 1 g of lithium perchlorate anhydride were dissolved in a mixed solvent consisting of 10 g of tetrahydrofuran and 10 g of propylene carbonate, and the resulting solution was added with 1.5 g of poly(ethyleneglycol)dimethacrylate (oxyethylene unit number=9, product of Nippon Oil and Fats Co., Ltd.) and 1.5 g of methoxypoly(ethyleneglycol) monomethacrylate (oxyethylene unit number=9, product of Nippon Oil and Fats Co., Ltd.). The viscosity of the mixed solution was adjusted by holding it at 40° C. under reduced pressure to remove solvent until the total remaining amount of the mixed solution was 15 g. The result was designated "organic polymer solution (1)." Into one batch of the organic polymer solution (1) there was dissolved 0.05 g of azobisisobutyronitrile as a thermalpolymerization initiator. The result was designated "organic polymer solution (2)." Another batch of the organic polymer solution (1) was added with a photopolymerization initiator instead of the thermalpolymerization initiator, namely, was added with 0.05 g of benzyldimethylketal. The result was designated "organic polymer solution (3)."

The positive electrode was fabricated by preparing a mixture of $LiCoO_2$ and ketjen black at a mixing ratio of 90:10 by weight, adding it with the organic polymer solution (2) at a mixing ratio of 3:1 by weight, casting the resulting mixture on an aluminum positive current collector, and subjecting it to thermalpolymerization by holding it at 105° C. for 1 hr, thereby obtaining a composite positive electrode.

Lithium metal used as the negative electrode active material for the battery was pressure-bonded to a stainless steel current collector.

Next, the organic polymer solution (3) destined to become a solid ion conductive polymer electrolyte layer according to the invention was spread on the lithium metal with a doctor knife applicator. The spread layer was polymerized by irradiating it with ultraviolet rays in room-temperature air at a luminous energy of 6 $mW/cm^2$ for 20 min, thereby producing a solid ion conductive polymer electrolyte layer.

This solid ion conductive polymer electrolyte layer and the composite positive electrode were laminated to produce a battery having a solid ion conductive polymer electrolyte.

Example 2

A somewhat excessive amount of the organic polymer solution (2) was applied to the surface of a negative electrode lithium metal sheet, whereafter a composite positive electrode fabricated in the manner of Example 1 was placed opposite the negative electrode lithium metal sheet to constitute a pair of electrodes, with a gap of 25 μm left between the surfaces of the sheetlike composite positive electrode and negative electrode lithium metal. The entire battery was then heated to about 100° C. as held in this state.

As a result, the organic polymer solution (2) disposed between the sheets constituting the composite positive electrode and the negative electrode lithium metal was thermalpolymerized into a solid polymer electrolyte layer, thereby producing a battery having a solid ion conductive polymer electrolyte.

Example 3

In this example, the positive electrode was fabricated by preparing a mixture of $LiCoO_2$ and ketjen black at a mixing ratio of 90:10 by weight, adding it with the polymer solution (1) at a mixing ratio of 3:1 by weight, casting the resulting mixture on an aluminum positive current collector, and curing it by irradiation with an electron beam irradiation device having an acceleration voltage of 200 kV.

Next, the organic polymer solution (1) was spread on the positive electrode with a doctor knife applicator and the spread layer was cured by irradiation with an electron beam in the same manner as described above to obtain a cured solid ion conductive polymer electrolyte layer.

Lithium metal used as the negative electrode active material for the battery was pressure-bonded to a stainless steel current collector. This lithium metal and the solid ion conductive polymer electrolyte layer were laminated to produce a battery having a solid ion conductive polymer electrolyte.

Example 4

A battery having a solid ion conductive polymer electrolyte was produced in the same manner as in Example 2 except that the organic polymer solution (2) of Example 1 was prepared using acetylated hydroxypropyl cellulose instead of the hydroxypropyl cellulose.

Example 5

A battery having a solid ion conductive polymer electrolyte was produced in the same manner as in Example 2 except that the organic polymer solution (2) of Example 1 was prepared using cyanoethylated hydroxyethyl starch instead of the hydroxypropyl cellulose.

Example 6

A battery having a solid ion conductive polymer electrolyte was produced in the same manner as in Example 2 except that the organic polymer solution (2) was prepared using 0.15 g each of poly(ethyleneglycol)dimethacrylate and methoxypoly(ethyleneglycol)monomethacrylate and 1 g of lithium perchlorate and that solvent was removed until the total remaining amount of the mixed solution was 12.3 g.

Example 7

A battery having a solid ion conductive polymer electrolyte was produced in the same manner as in Example 2 except that the organic polymer solution (2) was prepared using 4 g each of poly(ethyleneglycol)dimethacrylate and methoxypoly(ethyleneglycol)monomethacrylate and 1 g of lithium perchlorate and that solvent was removed until the total remaining amount of the mixed solution was 20 g.

Comparative Example 1

One gram of hydroxypropyl cellulose (HPC) and 1 g of lithium perchlorate anhydride were dissolved in 10 g of tetrahydrofuran, and 10 g of propylene carbonate was added to the result.

The solution was held at 40° C. under reduced pressure to remove solvent until the total remaining amount of the mixed solution was 12 g, thereby obtaining an HPC mixed solution.

The HPC mixed solution was spread on a composite positive electrode fabricated in the manner of Example 1, whereafter a battery was produced by overlaying it with a sheet of lithium metal so to leave a gap of 25 μm between the positive electrode and the negative electrode.

Comparative Example 2

One gram of lithium perchlorate anhydride was dissolved in 10 g of propylene carbonate and 1.5 g of poly(ethyleneglycol)dimethacrylate and 1.5 g of methoxypoly(ethyleneglycol)monomethacrylate were added and mixed in the result. The solution was then added with 0.05 g of azobisisobutyronitrile as a thermalpolymerization initiator. The result was designated "organic polymer solution (4)."

A battery having a solid ion conductive polymer electrolyte was produced in the same manner as in Example 2 except that the organic polymer solution (4) was used in place of the organic polymer solution (2) of Example 2.

Comparative Example 3

One gram of polyethylene oxide (product of Wako Pure Chemicals Co., Ltd., molecular weight: 2000) and 1 g of lithium perchlorate anhydride were dissolved in a mixed solvent consisting of 10 g of tetrahydrofuran and 10 g of propylene carbonate, and the resulting solution was added with 1.5 g of poly(ethyleneglycol)dimethacrylate and 1.5 g of methoxypoly(ethyleneglycol)monomethacrylate.

Next, 0.05 g of azobisisobutyronitrile was dissolved into the solution as a thermalpolymerization initiator. The result was designated "organic polymer solution (5)."

A battery having a solid ion conductive polymer electrolyte was produced in the same manner as in Example 2 except that the organic polymer solution (5) was used in place of the organic polymer solution (2) of Example 2.

the battery voltage reached 4.20 V and then discharged at a discharging current of 0.1 mA/cm$^2$ until the battery voltage reached 2.75 V. The battery life in charge-discharge cycles was defined as the number of cycles till the capacity reached 50% of the theoretical capacity of the positive electrode active material. The results are shown in Table 1.

As can be seen from these results, the battery having a solid ion conductive polymer electrolyte according to the present invention exhibits outstanding performance in terms of both ion conductivity and life in charge-discharge cycles.

TABLE 1

| | | Comparative Examples | | |
|---|---|---|---|---|
| | | 1 | 2 | 3 |
| Solid ion conductive polymer electrolyte layer | Hydroxypropyl cellulose | 1 | | |
| | Acetylated hydroxypropyl cellulose | | | |
| | Cyanoethylated hydroxyethyl starch | | | |
| | Polyethylene oxide | | | 1 |
| | Poly(ethyleneglycol)dimethacrylate | | 1.5 | 1.5 |
| | Methoxypoly(ethyleneglycol)monomethacrylate | | 1.5 | 1.5 |
| | Lithium perchlorate | 1 | 1 | 1 |
| | THF | 10 | 10 | 10 |
| | Propylene carbonate | 10 | 10 | 10 |
| Polymerization starting condition of solid ion conductive polymer electrolyte layer | | | Heat | Heat |
| Ion conductivity (S/cm) 25° C. | | $1.9 \times 10^{-4}$ | $2.1 \times 10^{-5}$ | $4.5 \times 10^{-4}$ |
| Number of cycles | | 0 | 0 | 0 |

| | | Examples | | | | | | |
|---|---|---|---|---|---|---|---|---|
| | | 1 | 2 | 3 | 4 | 5 | 6 | 7 |
| Solid ion conductive polymer electrolyte layer | Hydroxypropyl cellulose | 1 | 1 | 1 | | | 1 | 1 |
| | Acetylated hydroxypropyl cellulose | | | | 1 | | | |
| | Cyanoethylated hydroxyethyl starch | | | | | 1 | | |
| | Polyethylene oxide | | | | | | | |
| | Poly(ethyleneglycol) dimethacrylate | 1.5 | 1.5 | 1.5 | 1.5 | 1.5 | 0.15 | 4 |
| | Methoxypoly(ethyleneglycol) monomethacrylate | 1.5 | 1.5 | 1.5 | 1.5 | 1.5 | 0.15 | 4 |
| | Lithium perchlorate | 1 | 1 | 1 | 1 | 1 | 1 | 1 |
| | THF | 10 | 10 | 10 | 10 | 10 | 10 | 10 |
| | Propylene carbonate | 10 | 10 | 10 | 10 | 10 | 10 | 10 |
| Polymerization starting condition of solid ion conductive polymer electrolyte layer | | UV* | Heat | Electron beam | Heat | Heat | Heat | Heat |
| Ion conductivity (S/cm) 25° C. | | $4.1 \times 10^{-3}$ | $3.7 \times 10^{-3}$ | $3.8 \times 10^{-3}$ | $3.8 \times 10^{-3}$ | $3.9 \times 10^{-3}$ | $9.0 \times 10^{-4}$ | $8.0 \times 10^{-4}$ |
| Number of cycles | | 116 | 124 | 184 | 284 | 302 | 35 | 28 |

*UV: Ultraviolet rays

The solid ion conductive polymer electrolyte films used in Examples 1–7 and Comparative Examples 1–3 were sandwiched with copper foil and the ion conductivities of the solid ion conductive polymer electrolytes were measured by the alternating current impedance method.

The life of the batteries was evaluated for number of charge-discharge cycles. In each cycle, the tested battery was first charged at a charging current of 0.1 mA/cm$^2$ until

What is claimed is:

1. A battery having a solid ion conductive polymer electrolyte comprising a positive electrode, a negative electrode and a solid ion conductive polymer electrolyte layer formed by curing a composition for a solid polymer electrolyte comprising (1) hydroxyalkyl polysaccharide and/or hydroxyalkyl polysaccharide derivative obtained by introducing a $C_1$–$C_5$ alkyl, aromatic or cyano substituent through ester or ether bonding to some or all of the hydroxy groups in a hydroxyalkyl polysaccharide, (2) a mixture of a diester compound containing a polyoxyalkylene component and a monoester compound containing a polyoxyalkylene component, the diester compound containing a polyoxyalkylene component being represented by the formula

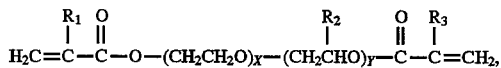

wherein $R_1, R_2, R_3$ each represents H or $C_1$–$C_5$ alkyl and are the same or different, and X and Y satisfy the condition of $X+Y \leq 50$, $X \geq 1$ and $Y \geq 0$ or the condition of $X+Y \leq 50$, $X \geq 0$ and $Y \geq 1$, and the monoester compound containing a polyoxyalkylene component being represented by the formula

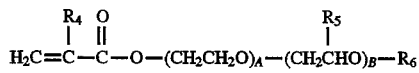

wherein $R_4, R_5, R_6$ each represents H or $C_1$–$C_5$ alkyl and are the same or different, and A and B satisfy the condition of $A+B \leq 50$, $A \geq 1$ and $B \geq 0$ or the condition of $A+B \leq 50$, $A \geq 0$ and $B \geq 1$, and (3) an ion conductive metallic salt.

2. A battery having a solid ion conductive polymer electrolyte according to claim 1, wherein the content of the component (2) is in the range of 20–2000 parts by weight per 100 parts by weight of the hydroxyalkyl polysaccharide and/or the hydroxyalkyl polysaccharide derivative.

3. A battery having a solid ion conductive polymer electrolyte according to claim 1, wherein the ratio of the diester compound containing a polyoxyalkylene component to the monoester compound containing a polyoxyalkylene component is 2.0–0.2 by weight.

4. A battery having a solid ion conductive polymer electrolyte according to claim 1, wherein the solid ion conductive polymer electrolyte is obtained by curing the composition for a solid polymer electrolyte by heating or irradiation with ultraviolet rays, an electron beam, X rays, gamma rays, microwaves or high-frequency waves.

5. A battery having a solid ion conductive polymer electrolyte according to claim 1, wherein the composition for a solid polymer electrolyte further comprises a solvent which can dissolve the ion conductive metallic salt.

* * * * *